United States Patent
Ii et al.

(10) Patent No.: US 10,933,756 B2
(45) Date of Patent: Mar. 2, 2021

(54) WIRELESS POWER TRANSMITTING DEVICE AND WIRELESS POWER TRANSMISSION SYSTEM

(71) Applicant: TDK CORPORATION, Tokyo (JP)

(72) Inventors: Akihiro Ii, Tokyo (JP); Ryo Miyazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 25 days.

(21) Appl. No.: 16/486,766

(22) PCT Filed: Mar. 1, 2018

(86) PCT No.: PCT/JP2018/007685
§ 371 (c)(1),
(2) Date: Aug. 16, 2019

(87) PCT Pub. No.: WO2018/159732
PCT Pub. Date: Sep. 7, 2018

(65) Prior Publication Data
US 2021/0001732 A1 Jan. 7, 2021

(30) Foreign Application Priority Data
Mar. 3, 2017 (JP) .............................. JP2017-040250

(51) Int. Cl.
*B60L 53/122* (2019.01)
*H02J 50/12* (2016.01)
(Continued)

(52) U.S. Cl.
CPC ............ *B60L 53/122* (2019.02); *H02J 50/12* (2016.02); *H02J 50/80* (2016.02); *H02J 50/90* (2016.02); *B60L 2210/40* (2013.01)

(58) Field of Classification Search
CPC .... B60L 53/122; B60L 2210/40; H02J 50/80; H02J 50/90; H02J 50/12
See application file for complete search history.

(56) References Cited

U.S. PATENT DOCUMENTS

2012/0242160 A1 9/2012 Tseng

FOREIGN PATENT DOCUMENTS

| JP | 2012-099644 A | 5/2012 |
| JP | 2016-086577 A | 5/2016 |

(Continued)

OTHER PUBLICATIONS

International Search Report issued in corresponding International Patent Application No. PCT/JP2018/007685, dated Apr. 10, 2018, with English Translation.

*Primary Examiner* — Robert L Deberadinis
(74) *Attorney, Agent, or Firm* — McDermott Will & Emery LLP

(57) ABSTRACT

A wireless power transmitting device transmits power by wireless to a wireless power receiving device through magnetic coupling between a feeding coil and a receiving coil and includes: a feeding circuit including a power conversion circuit that converts DC power into AC power of a drive frequency and a feeding coil unit including the feeding coil that receives the AC power supplied from the power conversion circuit to generate an AC magnetic field; and a control circuit Stu that controls the amount of magnetic flux generated from the feeding coil. The control circuit Stu calculates a separation distance between the feeding and receiving coils in their opposing direction from the circuit characteristic value of the wireless power transmitting device in a state where the amount of magnetic flux generated from the feeding coil is controlled so as to be constant.

16 Claims, 15 Drawing Sheets

(51) Int. Cl.
*H02J 50/90* (2016.01)
*H02J 50/80* (2016.01)

(56) References Cited

FOREIGN PATENT DOCUMENTS

| | | |
|---|---|---|
| JP | 2016-111873 A | 6/2016 |
| JP | 2017-017771 A | 1/2017 |

WIRELESS POWER TRANSMITTING DEVICE AND WIRELESS POWER TRANSMISSION SYSTEM

CROSS REFERENCE

This application is the U.S. National Phase under 35 US.C. § 371 of International Application No. PCT/JP2018/007685, filed on Mar. 1, 2018, which claims the benefit of Japanese Application No. 2017-040250, filed on Mar. 3, 2017, the entire contents of each are hereby incorporated by reference.

TECHNICAL FIELD

The present invention relates to a wireless power transmitting device and a wireless power transmission system.

BACKGROUND ART

There is known wireless power transmission technology that utilizes magnetic coupling between opposing primary (feeding) and secondary (receiving) coils to transmit energy of AC current applied to the primary coil to the secondary coil by wireless.

In the wireless power transmission technology, when power transmission is performed in a state where the relative positional relationship between the feeding coil and the receiving coil is inappropriate, unexpected voltage or current may be generated in each element in a circuit to cause element breakage. Thus, it has been considered that the relative positional relationship (specifically, the separation distances between the feeding and receiving coils in their opposing direction and in the direction perpendicular to the opposing direction) between the feeding coil and the receiving coil is calculated before the start of power transmission, based on which power transmission is performed.

Patent Document 1 discloses a technique for calculating the relative positional relationship between the feeding and receiving coils. In this technique, the receiving coil is mounted to a vehicle body, and the feeding coil is installed on the floor surface of a parking space. The separation distance between the feeding and receiving coils in their opposing direction (height direction) is calculated from the output value of a vehicle height sensor installed in a vehicle body. On the other hand, the separation distance in the direction (horizontal direction) perpendicular to the opposing direction is calculated based on the output impedance of a high-frequency power supply circuit provided on the feeding coil side.

CITATION LIST

Patent Document

[Patent Document 1] JP 2016-86577 A

SUMMARY OF INVENTION

Technical Problem to be Solved by Invention

However, according to the technique described in Patent Document 1, the vehicle height sensor is required for calculating the separation distance between the feeding and receiving coils in their opposing direction. The use of a sensor like the vehicle height sensor may increase cost, size, complexity of control, and the like, and thus improvement is required.

It is therefore an object of the present invention to provide a wireless power transmitting device and a wireless power transmission system capable of estimating the separation distance between the feeding and receiving coils in their opposing direction with high accuracy without using a special sensor.

Means for Solving the Problem

A wireless power transmitting device according to the present invention is a wireless power transmitting device that transmits power by wireless to a wireless power receiving device through magnetic coupling between a feeding coil and a receiving coil and includes: a feeding circuit including a power conversion circuit that converts DC power into AC power of a drive frequency and the feeding coil that receives the AC power supplied from the power conversion circuit to generate an AC magnetic field; and a control circuit that controls the amount of magnetic flux generated from the feeding coil, wherein the control circuit calculates a separation distance between the feeding and receiving coils in their opposing direction from the circuit characteristic value of the wireless power transmitting device in a state where the amount of magnetic flux generated from the feeding coil is controlled so as to be constant.

The wireless power transmitting device according to the present invention may be a wireless power transmitting device that transmits power by wireless to a wireless power receiving device through magnetic coupling between a feeding coil and a receiving coil and includes: a feeding circuit including a power conversion circuit that converts DC power into AC power of a drive frequency and the feeding coil that receives the AC power supplied from the power conversion circuit to generate an AC magnetic field; and a control circuit that controls current flowing in the feeding coil, wherein the control circuit calculates a separation distance between the feeding and receiving coils in their opposing direction from the circuit characteristic value of the wireless power transmitting device in a state where the current flowing in the feeding coil is controlled so as to be constant.

In a state where the amount of magnetic flux generated from the feeding coil is controlled so as to be constant, the inductance value of the feeding coil hardly changes with respect to a change in a separation distance between the feeding and receiving coils in the horizontal direction, while the inductance value of the feeding coil significantly changes with respect to a change in the separation distance between the feeding and receiving coils in their opposing direction. Thus, when the separation distance between the feeding and receiving coils in their opposing direction changes, the circuit characteristic value of the wireless power transmitting device also significantly changes. Thus, according to the present invention, it is possible to calculate the separation distance between the feeding and receiving coils in their opposing direction with high accuracy without using a special sensor.

In the above wireless power transmitting device, the feeding circuit may include a power supply circuit that converts power supplied from an external power supply into DC power and outputs the DC power to the power conversion circuit, and the control circuit may control the amount of magnetic flux generated from the feeding coil by changing at least one of the output DC current of the power supply circuit, the output DC voltage of the power supply circuit, and the DC power. Alternatively, the power conversion circuit may have a plurality of switching elements, and the control circuit may control the amount of magnetic flux generated from the feeding coil by changing the drive frequency or the time ratio of the plurality of switching elements. Thus, the amount of magnetic flux generated from the feeding coil can be controlled by the control circuit, allowing the intensity of AC magnetic field generated from the feeding coil to be kept constant.

In the above wireless power transmitting device, the feeding circuit may further include an impedance conversion circuit that has at least one of a capacitor and an inductor between the power conversion circuit and feeding coil, and the control circuit may control the amount of magnetic flux generated from the feeding coil by changing the reactance value of the impedance conversion circuit. Thus, the amount of magnetic flux generated from the feeding coil can be controlled by the control circuit, allowing the intensity of AC magnetic field generated from the feeding coil to be kept constant.

In the above wireless power transmitting device, the inductance value of the feeding coil may be variable, and the control circuit may control the amount of magnetic flux generated from the feeding coil by changing the inductance value of the feeding coil. Thus, the amount of magnetic flux generated from the feeding coil can be controlled by the control circuit, allowing the intensity of AC magnetic field generated from the feeding coil to be kept constant.

Further, in the above wireless power transmitting device, the control circuit may control the amount of magnetic flux generated from the feeding coil so as to be constant by controlling a circuit characteristic value of the type same as the circuit characteristic value of the wireless power transmitting device. A change in the inductance value of the feeding coil is reflected on the circuit characteristic value obtained as a result of controlling the amount of magnetic flux generated from the feeding coil so as to be constant, so that it is possible to calculate the separation distance between the feeding and receiving coils in their opposing direction with high accuracy.

A wireless power transmission system according to the present invention is a wireless power transmission system that transmits power from a wireless power transmitting device to a wireless power receiving device through magnetic coupling between a feeding coil and a receiving coil, wherein the wireless power transmitting device is any one of the above wireless power transmitting devices, the wireless power receiving device includes: the receiving coil that receives power through the AC magnetic field generated by the feeding coil; a rectification circuit that rectifies the power received by the receiving coil; and a voltage detection circuit that detects the output voltage of the rectification circuit, and the control circuit calculates a coupling coefficient between the feeding and receiving coils based on a detection result output from the voltage detection circuit and calculates the relative positional relationship between the feeding and receiving coils based on the coupling coefficient and the circuit characteristic value of the wireless power transmitting device. With this configuration, the relationship between the coupling coefficient between the feeding and receiving coils and the output voltage of the rectification circuit is monotonous, so that the control circuit can calculate the coupling coefficient between the feeding and receiving coils from the output voltage of the rectification circuit with high accuracy. Thus, it is possible to calculate the relative positional relationship between the feeding and receiving coils with high accuracy by combining the coupling coefficient and information obtained from the circuit characteristic value of the wireless power transmitting device in a state where the amount of magnetic flux generated from the feeding coil is controlled so as to be constant.

In the above wireless power transmission system, the control circuit may calculate transmittable power from the relative positional relationship between the feeding and receiving coils and may control the operation of the feeding circuit based on the calculated transmittable power. With this configuration, the control circuit can perform power control adequate for the calculated relative positional relationship, making it possible to prevent element breakage due to generation of unexpected voltage or current in a circuit.

The above wireless power transmission system may further include a switching circuit for switching a connection state between the output end of the rectification circuit and a load, and the switching circuit may open the output end of the rectification circuit when the control circuit calculates the coupling coefficient between the feeding and receiving coils based on the detection result output from the voltage detection circuit. With this configuration, it is possible to make the relationship between the coupling coefficient between the feeding and receiving coils and the output voltage of the rectification circuit independent of the load, allowing the control circuit to calculate the coupling coefficient between the feeding and receiving coils with higher accuracy.

The above wireless power transmission system may further include a load resistance having a fixed resistance value and a switching circuit for switching a connection state between the output end of the rectification circuit and a load or the load resistance, and the switching circuit may connect the output end of the rectification circuit to the load resistance when the control circuit calculates the coupling coefficient between the feeding and receiving coils based on the detection result output from the voltage detection circuit. Even with this configuration, it is possible to make the relationship between the coupling coefficient between the feeding and receiving coils and the output voltage of the rectification circuit independent of the load, allowing the control circuit to calculate the coupling coefficient between the feeding and receiving coils with higher accuracy.

The above wireless power transmission system may further include an alarm for notifying a user of information, the control circuit may calculate a separation distance between the feeding and receiving coils in a direction perpendicular to their opposing direction based on the separation direction between the feeding and receiving coils in their opposing direction and the detection result output from the voltage detection circuit, and the alarm may notify the user of the separation distance between the feeding and receiving coils in a direction perpendicular to their opposing direction. With this configuration, it is possible to notify the user of the separation distance between the feeding and receiving coils in the horizontal direction, thereby enhancing user convenience at positioning of the feeding and receiving coils.

A wireless power transmission system according to another aspect of the present invention is a wireless power transmission system that transmits power from a wireless power transmitting device to a wireless power receiving device through magnetic coupling between a feeding coil and a receiving coil, wherein the wireless power transmitting device includes: a feeding circuit including a power conversion circuit that converts DC power into AC power of a drive frequency and the feeding coil that receives the AC power supplied from the power conversion circuit to generate an AC magnetic field; and a control circuit that controls the amount of magnetic flux generated from the feeding coil, the wireless power receiving device includes: the receiving coil that receives power through the AC magnetic field generated by the feeding coil; a rectification circuit that rectifies the power received by the receiving coil; and a voltage detection circuit that detects the output voltage of the rectification circuit, and the control circuit acquires the circuit characteristic value of the wireless power transmitting device in a state where the amount of magnetic flux generated from the feeding coil is controlled so as to be constant, calculates a coupling coefficient between the feeding and receiving coils based on a detection result output from the voltage detection circuit and calculates the relative positional relationship between the feeding and receiving coils based on the circuit characteristic value and the coupling coefficient. The wireless power transmission system according to the another aspect of the present invention may be a wireless power transmission system that transmits power from a wireless power transmitting device to a wireless power receiving device through magnetic coupling between a feeding coil and a receiving coil, wherein the wireless power transmitting device includes: a feeding circuit including a power conversion circuit that converts DC power into AC power of a drive frequency and the feeding coil that receives the AC power supplied from the power conversion circuit to generate an AC magnetic field; and a control circuit that controls current flowing in the feeding coil, the wireless power receiving device includes: the receiving coil that receives power through the AC magnetic field generated by the feeding coil; a rectification circuit that rectifies the power received by the receiving coil; and a voltage detection circuit that detects the output voltage of the rectification circuit, and the control circuit acquires the circuit characteristic value of the wireless power transmitting device in a state where the amount of current flowing in the feeding coil is controlled so as to be constant, calculates a coupling coefficient between the feeding and receiving coils based on a detection result output from the voltage detection circuit and calculates the relative positional relationship between the feeding and receiving coils based on the circuit characteristic value and the coupling coefficient. With this configuration, it is possible to calculate the relative positional relationship between the feeding and receiving coils from the circuit characteristic value of the wireless power transmitting device in a state where the amount of magnetic flux generated from the feeding coil is controlled so as to be constant and the coupling coefficient between the feeding and receiving coils, allowing power transmission to the wireless power receiving device to be executed with power adequate for the relative positional relationship between the feeding and receiving coils. Further, it is possible to notify a user of the magnitude of displacement in the travel direction and that in the vehicle width direction.

Advantageous Effects of the Invention

According to the present invention, it is possible to calculate the separation distance between the feeding and receiving coils in their opposing direction with high accuracy without using a special sensor.

According to another aspect of the present invention, it is possible to execute power transmission to the wireless power receiving device with power adequate for the relative positional relationship between the feeding and receiving coils and to notify a user of the magnitude of displacement in the travel direction and that in the vehicle width direction without using a special sensor.

MODE FOR CARRYING OUT THE INVENTION

Hereinafter, embodiments of the present invention will be described in detail with reference to the accompanying drawings. First, the outline of the present invention will be described with reference to FIG. 1 and FIG. 2 and then details of the present invention will be described with reference to FIG. 3 et seq.

Figure 1A:
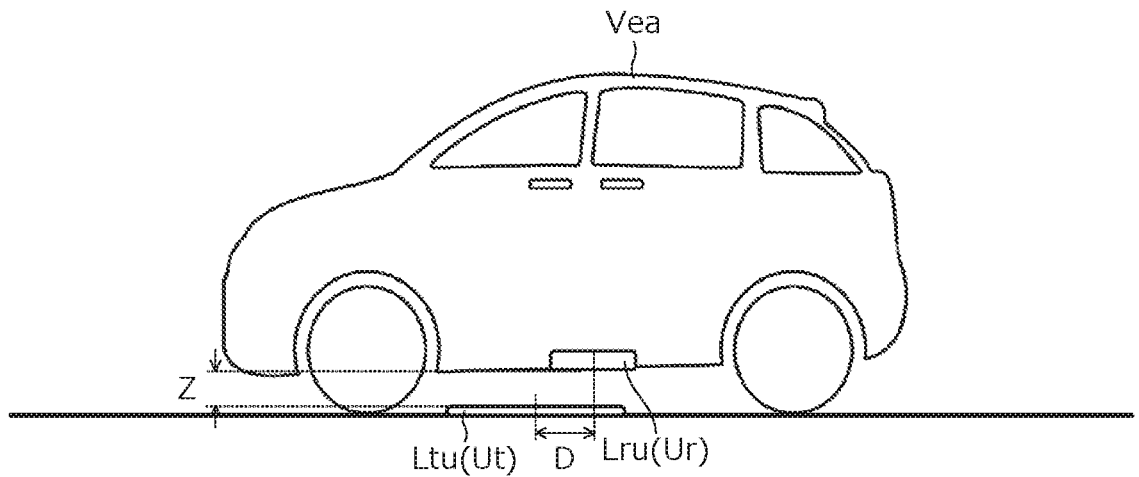
FIG. 1 A and FIG. 1B are views illustrating the use state of a wireless power transmission system according to an embodiment of the present invention.
Figure 1B:
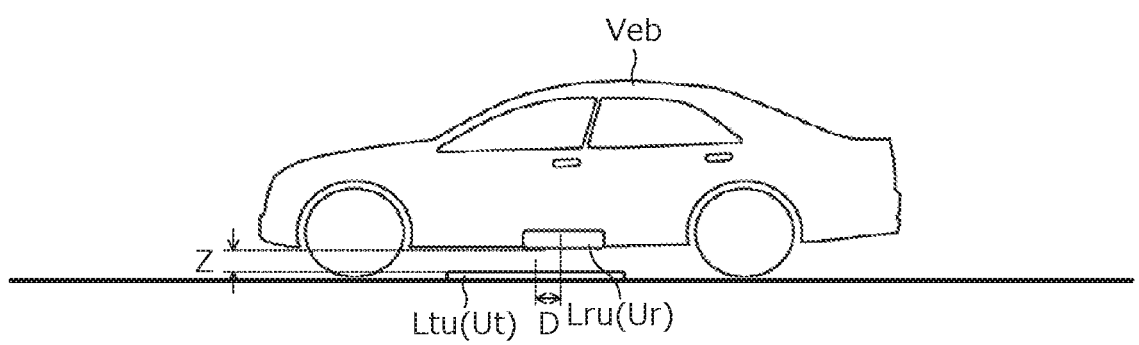

FIG. 1 is a view illustrating the use state of a wireless power transmission system according to an embodiment of the present invention. FIG. 1A illustrates an example in which the wireless power transmission system is used for transmitting power to an electric car Vea (e.g., SUV) having a comparatively high minimum ground clearance, and FIG. 1B illustrates an example in which the wireless power transmission system is used for transmitting power to an electric car Veb (e.g., sedan) having a comparatively low minimum ground clearance.

The wireless power transmission system is constituted of a wireless power transmitting device Ut including a feeding coil unit Ltu and a wireless power receiving device Ur including a receiving coil unit Lru. As illustrated in FIG. 1, the feeding coil unit Ltu is a device installed on a road surface and includes a not-shown feeding coil. On the other hand, the receiving coil unit Lru is installed on the bottom surface of a vehicle body and includes a not-shown receiving coil. When charging the electric car Vea or Veb, a user moves the electric car above the feeding coil unit Ltu to dispose the receiving coil unit Lru in a magnetic field generated by the feeding coil. As a result, power is transmitted from the wireless power transmitting device Ut to the wireless power receiving device Ur through magnetic coupling between the feeding and receiving coils, and a secondary battery (not illustrated) provided in the electric car is charged with thus transmitted power.

To adequately execute power transmission from the wireless power transmitting device Ut to the wireless power receiving device Ur, it is necessary to adequately control the amount of magnetic flux generated from the feeding coil according to the relative positional relationship between the feeding and receiving coils. Thus, the wireless power transmitting device Ut according to the present embodiment calculates the relative positional relationship between the feeding and receiving coils before starting power transmission. Then, transmittable power is calculated from the calculated relative positional relationship, and the operation of an internal circuit (not illustrated in FIG. 1) is controlled based on the calculated transmittable power.

The relative positional relationship between the feeding and receiving coils is represented by separation distances D and Z illustrated in FIG. 1. The separation distance Z is the distance between the feeding coil unit Ltu and the receiving coil unit Lru in their opposing direction (height direction), and the separation distance D is the distance therebetween in the direction (horizontal direction) perpendicular to the opposing direction. The wireless power transmitting device Ut calculates the distances Z and D before starting power transmission.

Figure 2A:
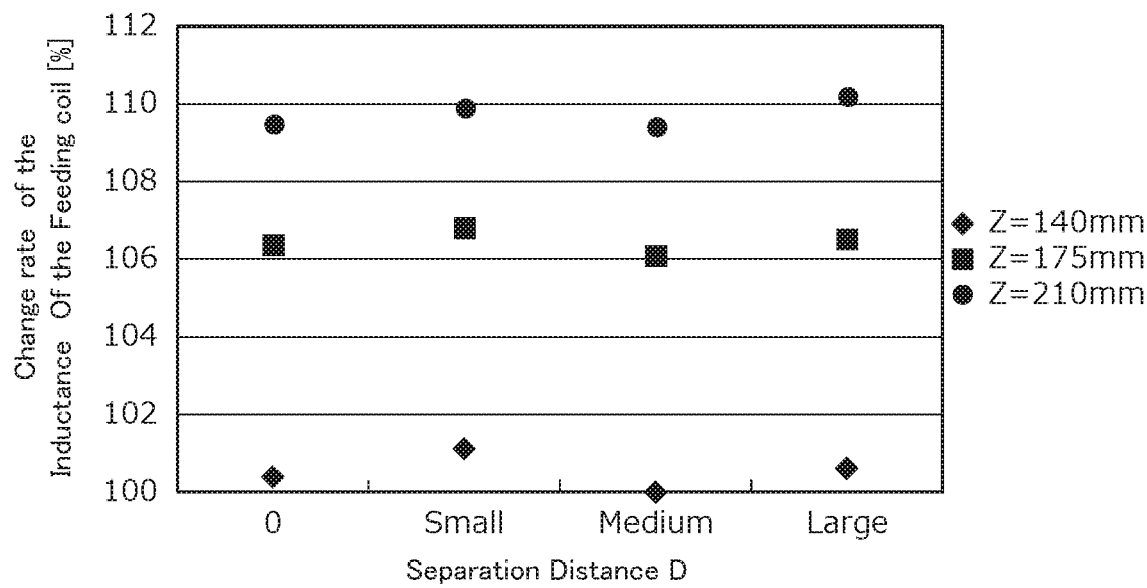
FIG. 2A is a view illustrating the change rate of the inductance value of the feeding coil with respect to the distance D.
Figure 2B:
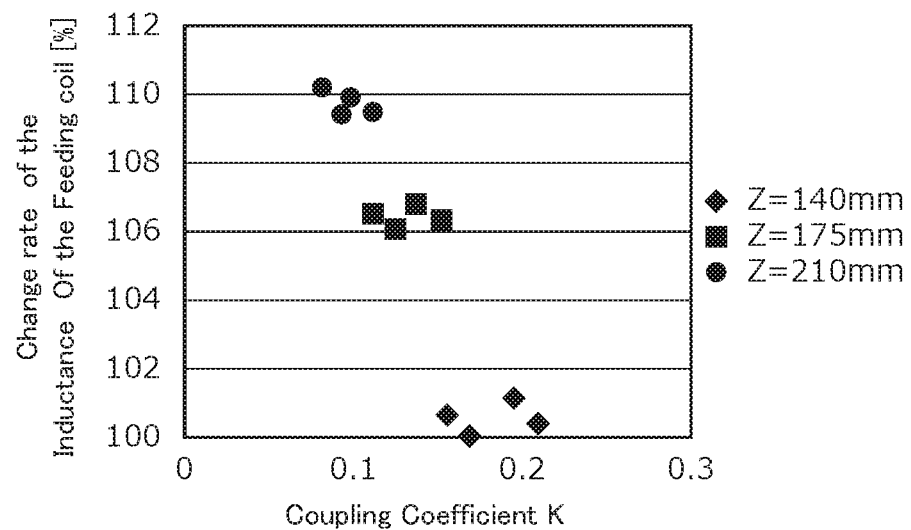
FIG. 2B is a view in which the horizontal axis of FIG. 2A is replaced by a coupling coefficient k between the feeding and receiving coils.

FIG. 2A is a view illustrating the change rate of the inductance value of the feeding coil with respect to the distance D. The horizontal axis of FIG. 2A represents the separation distance D, and the vertical axis represents a difference (change rate) from the minimum inductance at a separation distance of 140 mm by percentage. FIG. 2B is a view in which the horizontal axis of FIG. 2A is replaced by a coupling coefficient k between the feeding and receiving coils. In general, when the separation distance Z is constant, the larger the separation distance D is, the smaller the coupling coefficient k becomes.

As can be understood from FIG. 2A, the inductance value of the feeding coil hardly changes with respect to a change in the separation distance D in the horizontal direction but significantly changes with respect to a change in the separation distance Z in the opposite direction. Accordingly, when the inductance value of the feeding coil is known, the separation distance Z can be calculated. The wireless power transmitting device Ut according to the present embodiment calculates the separation distance Z by utilizing this principle.

Further, the wireless power transmitting device Ut according to the present embodiment calculates the coupling coefficient k between the feeding and receiving coils based on information from the wireless power receiving device Ur. Although details of the coupling coefficient k will be described later in a fifth embodiment, the coupling coefficient k changes depending on the separation distance D when the separation distance Z is constant. Thus, when the separation distance Z is known, the separation distance D can be calculated from the coupling coefficient k, so that the wireless power transmitting device Ut according to the present embodiment calculates the separation distance D by utilizing this principle.

The wireless power transmitting device Ut calculates the transmittable power based on the thus calculated separation distances Z and D. Hereinafter, three embodiments (first to third embodiments) of the wireless power transmitting device Ut that performs such processing will be described with reference to FIGS. 3 to 6, and then five embodiments (fourth to eighth embodiments) of the wireless power transmission system including the wireless power transmitting device Ut will be described in detail with reference to FIGS. 7 to 11.

Figure 3:
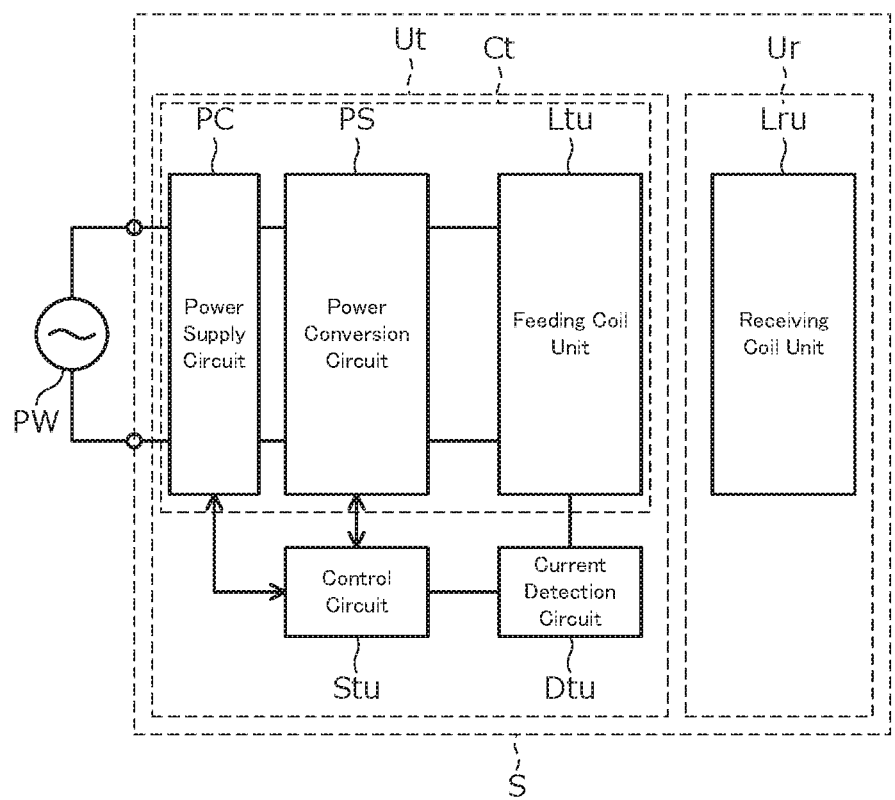
FIG. 3 is a view illustrating the configuration of the wireless power transmitting device Ut according to a first embodiment of the present invention.

FIG. 3 is a view illustrating the configuration of the wireless power transmitting device Ut according to the first embodiment of the present invention. As illustrated, the wireless power transmitting device Ut according to the present embodiment constitutes a wireless power transmission system S together with the wireless power receiving device Ur including the receiving coil unit Lru illustrated in FIG. 1.

The wireless power transmitting device Ut is a device that transmits power by wireless to the wireless power receiving device Ur through magnetic coupling between the feeding and receiving coils and includes, in addition to the feeding coil unit Ltu illustrated in FIG. 1, a power supply circuit PC, a power conversion circuit PS, a control circuit Stu, and a current detection circuit Dtu. The feeding coil unit Ltu, power supply circuit PC, and power conversion circuit PS constitute a feeding circuit Ct of the wireless power transmitting device Ut.

The power supply circuit PC is a circuit that converts AC power supplied from an external power supply PW which is, e.g., a commercial AC power supply into desired DC power and outputs it and is constituted by, e.g., a PFC (Power Factor Correction) or a stabilized power supply.

The power conversion circuit PS is a circuit that converts the DC power supplied from the power supply circuit PC into AC power of a predetermined drive frequency and is, specifically, a switching power supply including a plurality of switching elements. The switching elements are bridge-connected to each other. Examples of the switching element to be used include a MOS-FET (Metal Oxide Semiconductor-Field Effect Transistor) and an IGBT (Insulated Gate Bipolar Transistor).

The feeding coil unit Ltu includes the feeding coil that receives the AC power supplied from the power conversion circuit PS to thereby generate an AC magnetic field. When the AC power generated by the power conversion circuit PS is supplied to both ends of the feeding coil, AC current flows in the feeding coil to generate an AC magnetic field around the feeding coil. When the receiving coil enters the AC magnetic field, an induction current flows in the receiving coil. This allows power transmission from the wireless power transmitting device Ut to the wireless power receiving device Ur to be achieved. The feeding coil unit Ltu may include a capacitor connected to the feeding coil and constituting a resonance circuit together with the feeding coil.

The current detection circuit Dtu is a circuit that detects the value (hereinafter, referred to as "feeding coil current value") of current flowing in the feeding coil included in the feeding coil unit Ltu. The current detection circuit Dtu outputs the detected feeding coil current value to the control circuit Stu.

The control circuit Stu is a circuit that has a function of calculating the relative positional relationship (specifically, the above-mentioned separation distances Z and D) between the feeding and receiving coils, calculating the transmittable power from the calculated relative positional relationship, and controlling the operation of the feeding circuit Ct based on the calculated transmittable power. Hereinafter, the function of the control circuit Stu will be described in detail with reference to the flow chart of FIG. 4.

Figure 4:
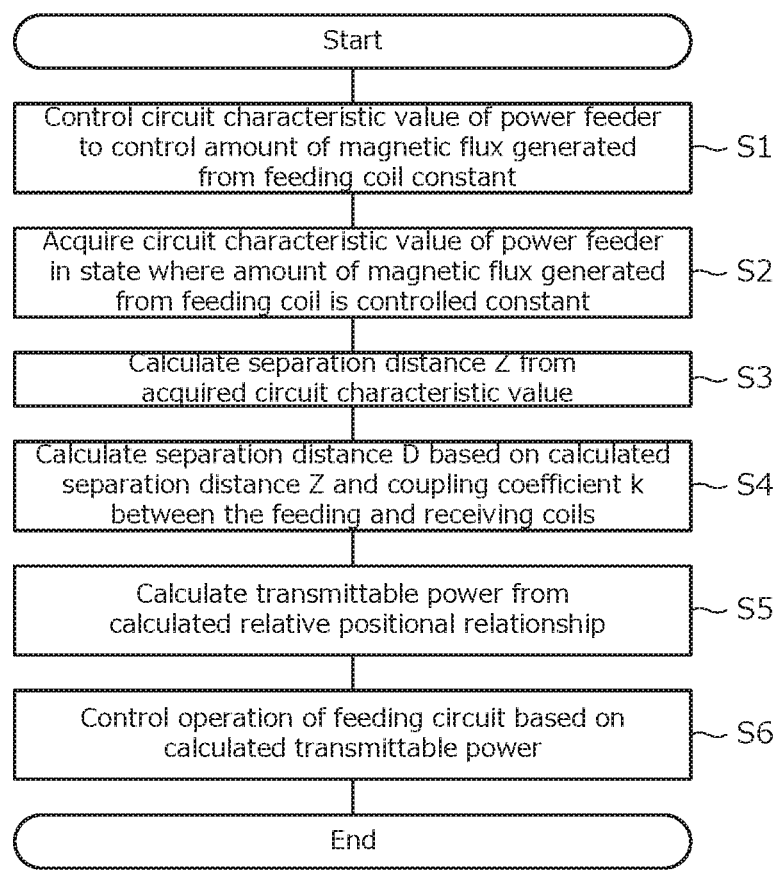
FIG. 4 is a flowchart illustrating a processing flow performed in the control circuit Stu.

FIG. 4 is a flowchart illustrating a processing flow performed in the control circuit Stu. The control circuit Stu controls the circuit characteristic value of the wireless power transmitting device Ut to control the amount of magnetic flux generated from the feeding coil so as to be constant (step S1). The circuit characteristic value mentioned here may include various values; in the present embodiment, it is at least one of the output DC current of the power supply circuit PC, output DC voltage of the power supply circuit PC, DC power supplied from the power supply circuit PC to power conversion circuit PS, the frequency (the above-mentioned drive frequency) of the AC power generated by the power conversion circuit PS, and the time ratio (on/off duty) of the plurality of switching elements constituting the power conversion circuit PS.

When the output DC current of the power supply circuit PC, output DC voltage of the power supply circuit PC, or DC power supplied from the power supply circuit PC to the power conversion circuit PS is used as the circuit characteristic value of the wireless power transmitting device Ut, the control circuit Stu controls the circuit characteristic value of the wireless power transmitting device Ut by controlling the power supply circuit PC. When the frequency (the above-mentioned drive frequency) of the AC power generated by the power conversion circuit PS or the time ratio (on/off duty) of the plurality of switching elements constituting the power conversion circuit PS is used as the circuit characteristic value of the wireless power transmitting device Ut, the control circuit Stu controls the circuit characteristic value of the wireless power transmitting device Ut by controlling the power conversion circuit PS.

Further, the control circuit Stu uses the feeding coil current value as a monitoring value for grasping whether or not the amount of magnetic flux generated from the feeding coil in the feeding coil unit Ltu is constant. That is, the amount of magnetic flux generated from the feeding coil is controlled so as to be constant by controlling the circuit characteristic value of the wireless power transmitting device Ut so as to make the feeding coil current value constant. It can be said that when the feeding coil current value is constant, the amount of magnetic flux generated from the feeding coil is also constant. Hence, this control makes it possible to control the amount of magnetic flux generated from the feeding coil so as to remain constant. Although the feeding coil current value that the current detection circuit Dtu detects for grasping whether or not the amount of magnetic flux generated from the feeding coil in the feeding coil unit Ltu is constant is used in the present embodiment, any other method may be used as long as it can grasp whether or not the amount of magnetic flux generated from the feeding coil is constant.

Then, the control circuit Stu acquires the circuit characteristic value of the wireless power transmitting device Ut in a state where the amount of magnetic flux generated from the feeding coil is controlled constant (step S2). The circuit characteristic value to be acquired here is the same circuit characteristic value as that set as an object to be controlled in step S1. Then, the control circuit Stu calculates the separation distance Z between the feeding and receiving coils in their opposing direction from the acquired circuit characteristic value (step S3). As described above, the inductance value of the feeding coil changes depending on the separation distance Z, and the change in the inductance value of the feeding coil is reflected on the circuit characteristic value required for controlling the amount of magnetic flux generated from the feeding coil so as to be constant, thus allowing the control circuit Stu to calculate the separation distance Z based on the circuit characteristic value acquired in step S2. Specifically, a lookup table showing the relationship between the circuit characteristic value and the separation distance Z is prepared in advance, and the separation distance Z corresponding to the acquired circuit characteristic value is read from the lookup table so as to obtain the separation distance Z.

Subsequently, the control circuit Stu calculates the separation distance D between the feeding and receiving coils in the horizontal direction based on the calculated separation distance Z and the coupling coefficient k (see FIG. 2B) between the feeding and receiving coils (step S4). A method of acquiring the coupling coefficient k will be described later in a fourth embodiment. As described above, the coupling coefficient k changes depending on the separation distance D when the separation distance Z is constant, thus allowing the control circuit Stu to calculate the separation distance D based on the separation distance Z and the coupling coefficient k. Specifically, a lookup table showing the relationship between the coupling coefficient k and the separation distance D is prepared in advance for each separation distance Z, and a lookup table corresponding to the separation distance Z calculated in step S3 is read, followed by reading of the separation distance D corresponding to the acquired coupling coefficient k from the read lookup table so as to obtain the separation distance D.

Then, the control circuit Stu calculates the transmittable power from the calculated relative positional relationship (separation distances Z and D) (step S5). Specifically, like the above calculation, a lookup table showing the relationship among the separation distance Z, separation distance D, and transmittable power is stored in advance, and the transmittable power corresponding to the calculated separation distances Z and D is read from the lookup table.

Finally, the control circuit Stu controls the operation of the feeding circuit Ct based on the calculated transmittable power (step S6). Specifically, the control circuit Stu executes operation control for either one or both of the power supply circuit PC and power conversion circuit PS to realize power transmission with the transmittable power calculated in step S5. As a result, power transmission to the wireless power receiving device Ur is executed with power adequate for the relative positional relationship between the feeding and receiving coils.

As describe above, with the wireless power transmitting device Ut according to the present embodiment, it is possible to calculate the separation distance Z from the circuit characteristic value of the wireless power transmitting device Ut in a state where the amount of magnetic flux generated from the feeding coil is controlled so as to be constant. This allows the separation distance Z to be calculated with high accuracy without using a special sensor like a vehicle height sensor. Further, the separation distance D can also be calculated, allowing power transmission to the wireless power receiving device Ur to be executed with power adequate for the relative positional relationship between the feeding and receiving coils.

Figure 5:
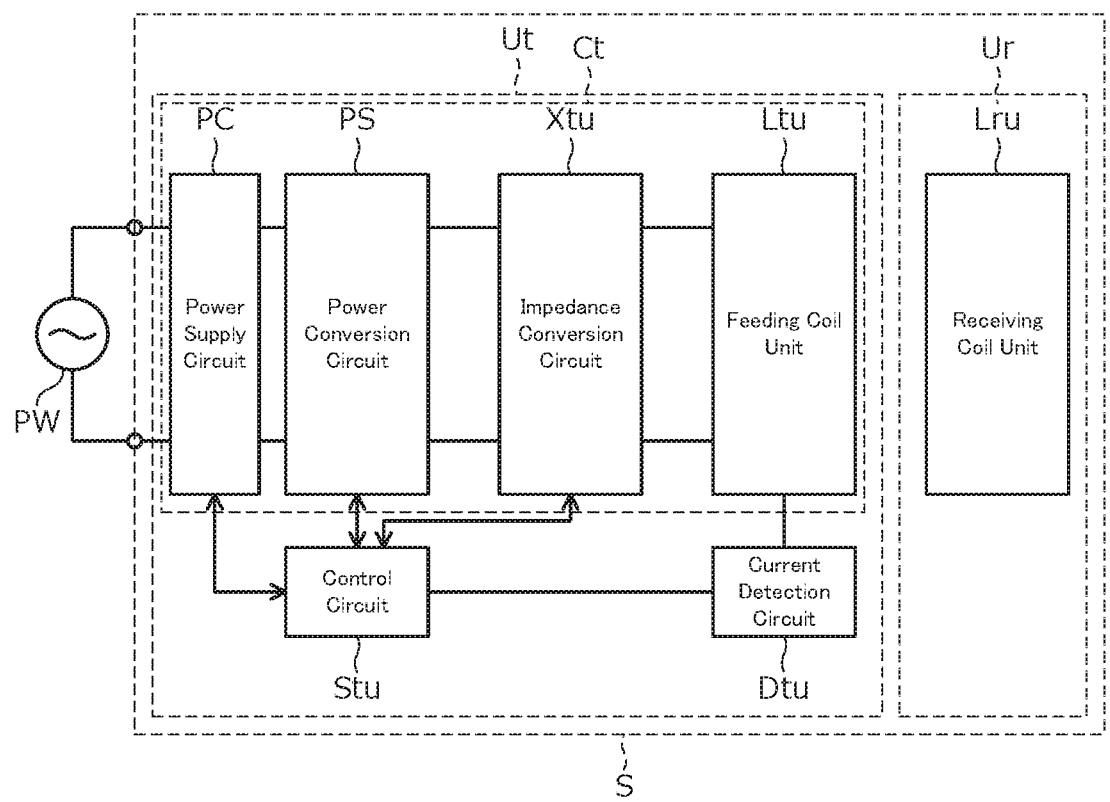
FIG. 5 is a view illustrating the configuration of the wireless power transmitting device Ut according to a second embodiment of the present invention.

FIG. 5 is a view illustrating the configuration of the wireless power transmitting device Ut according to the second embodiment of the present invention. The wireless power transmitting device Ut according to the present embodiment differs from the wireless power transmitting device Ut according to the first embodiment in that it further has an impedance conversion circuit Xtu. Hereinafter, the same reference numerals are given to the same parts as those in the first embodiment, and description will be made focusing the difference from the first embodiment.

The impedance conversion circuit Xtu is a circuit that is provided between the power conversion circuit PS and the feeding coil and has at least one of a capacitor and an inductor. The impedance conversion circuit Xtu constitutes the feeding circuit Ct of the wireless power transmitting device Ut together with the feeding coil unit Ltu, power supply circuit PC, and power conversion circuit PS. Specific examples of the configuration of the impedance conversion circuit Xtu include a configuration in which connection between a plurality of capacitors or connection between a plurality of indictors is switched by a switch means, a configuration in which a capacitor or an inductor is constituted by a variable element, and the like. The reactance value of the impedance conversion circuit Xtu can be changed by the control circuit Stu.

The control circuit Stu according to the present embodiment uses the reactance value of the impedance conversion circuit Xtu as the circuit characteristic value of the wireless power transmitting device Ut described in the first embodiment. That is, in step S1 of FIG. 4, the control circuit Stu controls the reactance value of the impedance conversion circuit Xtu to thereby control the amount of magnetic flux generated from the feeding coil so as to be constant. In step S2 of FIG. 4, the control circuit Stu acquires the reactance value of the impedance conversion circuit Xtu in a state where the amount of magnetic flux generated from the feeding coil is controlled so as to be constant. In step S3 of FIG. 4, the control circuit Stu calculates the separation distance Z from the acquired reactance value. A change in the inductance value of the feeding coil is reflected on the reactance value of the impedance conversion circuit Xtu required for controlling the amount of magnetic flux generated from the feeding coil so as to be constant, thus allowing the control circuit Stu to calculate the separation distance Z from the acquired reactance value.

Processing of step S4 et seq. are basically the same as those described in the first embodiment. However, as the operation control for the feeding circuit Ct in step S6, the reactance value of the impedance conversion circuit Xtu may be controlled. The control for the reactance value may be performed together with the operation control for the power supply circuit PC and operation control for the power conversion circuit PS, or may be performed independently.

As described above, with the wireless power transmission system S according to the present embodiment, it is possible to calculate the separation distance Z from the reactance value of the impedance conversion circuit Xtu in a state where the amount of magnetic flux generated from the feeding coil is controlled so as to be constant. Thus, also in the present embodiment, it is possible to calculate the separation distance Z with high accuracy without using a special sensor like a vehicle height sensor.

Figure 6:
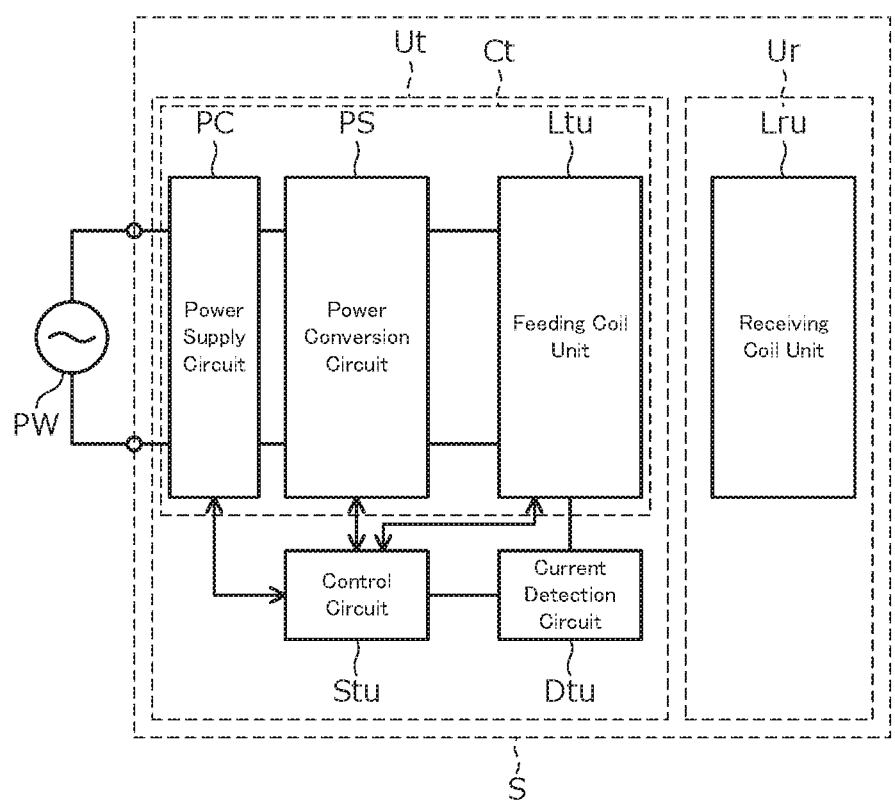
FIG. 6 is a view illustrating the configuration of the wireless power transmitting device Ut according to a third embodiment of the present invention.

FIG. 6 is a view illustrating the configuration of the wireless power transmitting device Ut according to the third embodiment of the present invention. The wireless power transmitting device Ut according to the present embodiment differs from the wireless power transmitting device Ut according to the first embodiment in that the inductance value of the feeding coil is variable. Hereinafter, the same reference numerals are given to the same parts as those in the first embodiment, and description will be made focusing the difference from the first embodiment.

The feeding coil included in the feeding coil unit Ltu according to the present embodiment is a variable inductance coil, and the inductance value thereof can be changed by the control circuit Stu.

The control circuit Stu according to the present embodiment uses the inductance value of the feeding coil as the circuit characteristic value of the wireless power transmitting device Ut described in the first embodiment. That is, in step S1 of FIG. 4, the control circuit Stu controls the inductance value of the feeding coil to thereby control the amount of magnetic flux generated from the feeding coil so as to be constant. In step S2 of FIG. 4, the control circuit Stu acquires the inductance value of the feeding coil in a state where the amount of magnetic flux generated from the feeding coil is controlled so as to be constant. In step S3 of FIG. 4, the control circuit Stu calculates the separation distance Z from the acquired inductance value. Processing of step S4 et seq. are the same as those described in the first embodiment.

Although processing of step S4 et seq. are basically the same as those described in the first embodiment, as the operation control for the feeding circuit Ct in step S6, the inductance value of the feeding coil included in the feeding coil unit Ltu may be controlled. The control for the inductance value may be performed together with the operation control for the power supply circuit PC and operation control for the power conversion circuit PS, or may be performed independently.

As described above, with the wireless power transmission system S according to the present embodiment, it is possible to calculate the separation distance Z from the inductance value of the feeding coil in a state where the amount of magnetic flux generated from the feeding coil is controlled so as to be constant. Thus, also in the present embodiment, it is possible to calculate the separation distance Z with high accuracy without using a special sensor like a vehicle height sensor.

Figure 7:
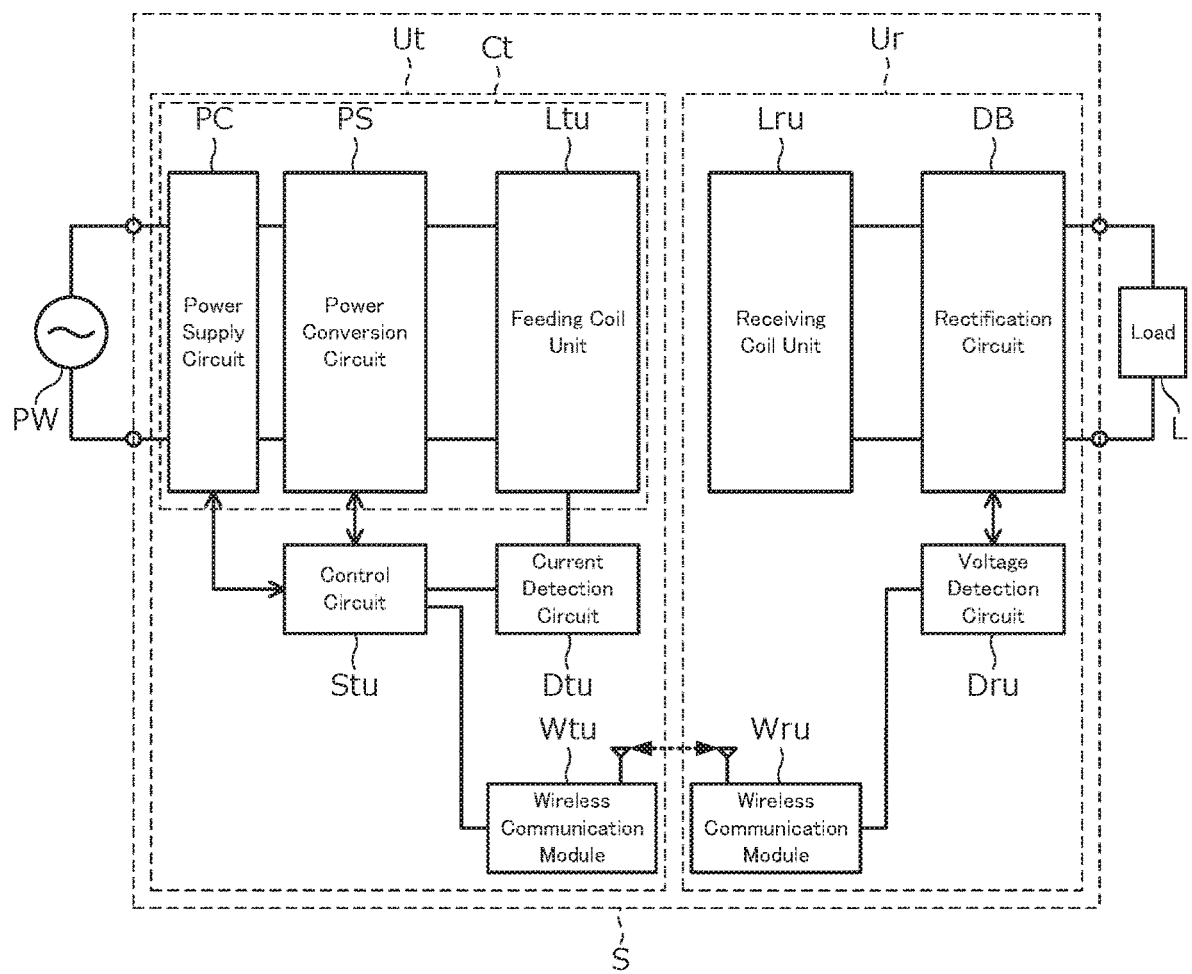
FIG. 7 is a view illustrating the configuration of the wireless power transmission system S according to a fourth embodiment of the present invention.

FIG. 7 is a view illustrating the configuration of the wireless power transmission system S according to the fourth embodiment of the present invention. The configuration of the wireless power transmission system S according to the present embodiment is the same as that of the wireless power transmission system S according to the first embodiment. In the present embodiment, some configurations (particularly, a configuration concerning calculation of the coupling coefficient k) of which illustration and description have been omitted in the first embodiment will be described.

As illustrated in FIG. 7, the wireless power transmitting device Ut has a wireless communication module Wtu in addition to the components described in the first embodiment. Further, the wireless power receiving device Ur has a rectification circuit DB, a voltage detection circuit Dru, and a wireless communication module Wru in addition to the receiving coil unit Lru.

First, focusing on the wireless power receiving device Ur, the receiving coil unit Lru includes the receiving coil that receives power through the AC magnetic field generated by the feeding coil of the wireless power transmitting device Ut. The receiving coil unit Lru may include a capacitor connected to the receiving coil and constituting a resonance circuit together with the receiving coil. The rectification circuit DB is a circuit that generates DC power by rectifying power received by the receiving coil. The DC power generated by the rectification circuit DB is supplied to a load L. The load L is, e.g., a secondary battery provided in a vehicle body in which the wireless power receiving device Ur is installed.

The voltage detection circuit Dru is a circuit that detects the output voltage of the rectification circuit DB. The wireless communication module Wru is a module having a wireless communication function and plays a role of transmitting the output voltage detected by the voltage detection circuit Dru to the wireless power transmitting device Ut by wireless.

Next, focusing on the wireless power transmitting device Ut, the wireless communication module Wtu is a module having a wireless communication function and is configured to receive the output voltage transmitted by the wireless communication module Wru. The received output voltage is supplied to the control circuit Stu.

The control circuit Stu receives, from the wireless communication module Wtu, the output voltage detected by the voltage detection circuit Dru in a state where the amount of magnetic flux generated from the feeding coil is controlled so as to be constant and acquires the coupling coefficient k between the feeding and receiving coils as described above based on the output voltage (see step S4 in FIG. 4). When the amount of magnetic flux generated from the feeding coil is constant, and the relative positional relationship between the feeding and receiving coils is not changed, then the relationship between the coupling coefficient k and the output voltage of the rectification circuit DB is monotonous, so that the control circuit Stu can calculate the coupling coefficient k through the above processing. Specifically, a lookup table showing the relationship between the coupling coefficient k and the output voltage of the rectification circuit DB is prepared in advance, and the coupling coefficient k corresponding to the received output voltage is read out from the lookup table so as to obtain the coupling coefficient k. Processing that the control circuit Stu performs using the thus acquired coupling coefficient k is as described in the first embodiment.

As described above, according to the wireless power transmission system S of the present embodiment, the coupling coefficient k between the feeding and receiving coils can be acquired in the wireless power transmitting device Ut.

Figure 8:
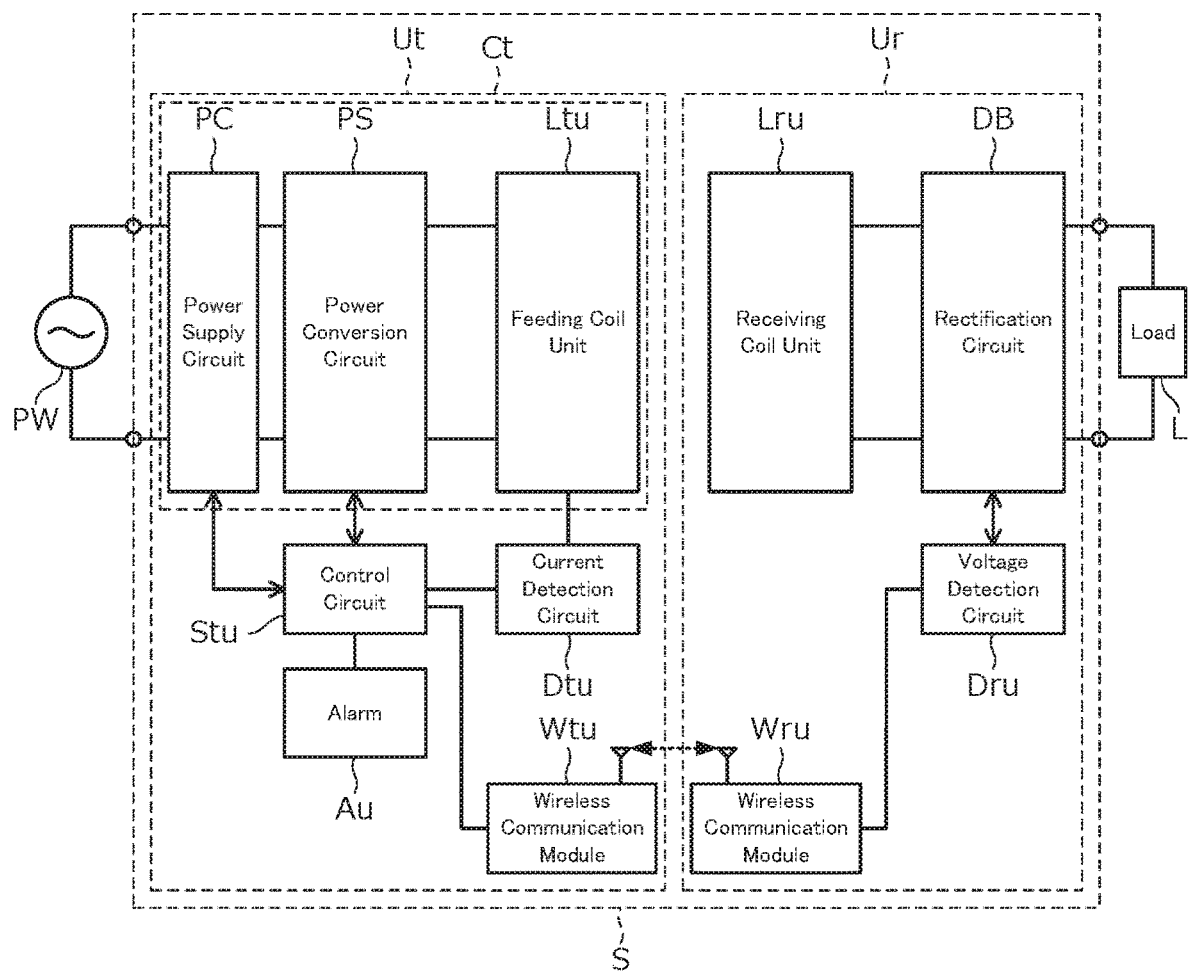
FIG. 8 is a view illustrating the configuration of the wireless power transmission system S according to a fifth embodiment of the present invention.

FIG. 8 is a view illustrating the configuration of the wireless power transmission system S according to the fifth embodiment of the present invention. The wireless power transmission system S according to the present embodiment differs from the wireless power transmission system S according to the fourth embodiment in that the wireless power transmitting device Ut further has an alarm Au. Hereinafter, the same reference numerals are given to the same parts as those in the fourth embodiment, and description will be made focusing the difference from the fifth embodiment.

The alarm Au is a device that notifies a user of information and is provided as a part of the wireless power transmitting device Ut in the present embodiment. Specifically, the information notified by the alarm Au is the separation distance D calculated by the control circuit Stu. Specific informing methods may include a method of displaying a numeric value indicating the separation distance D on a predetermined display device, a method of emitting a predetermined sound when the separation distance D is within a predetermined range, and a method of lighting a predetermined lamp when the separation distance D is within a predetermined range. Thus, it is possible to notify the user of the separation distance D, allowing the user to position the feeding and receiving coils while checking the separation distance D. That is, user convenience at positioning of the feeding and receiving coils is enhanced.

Figure 9:
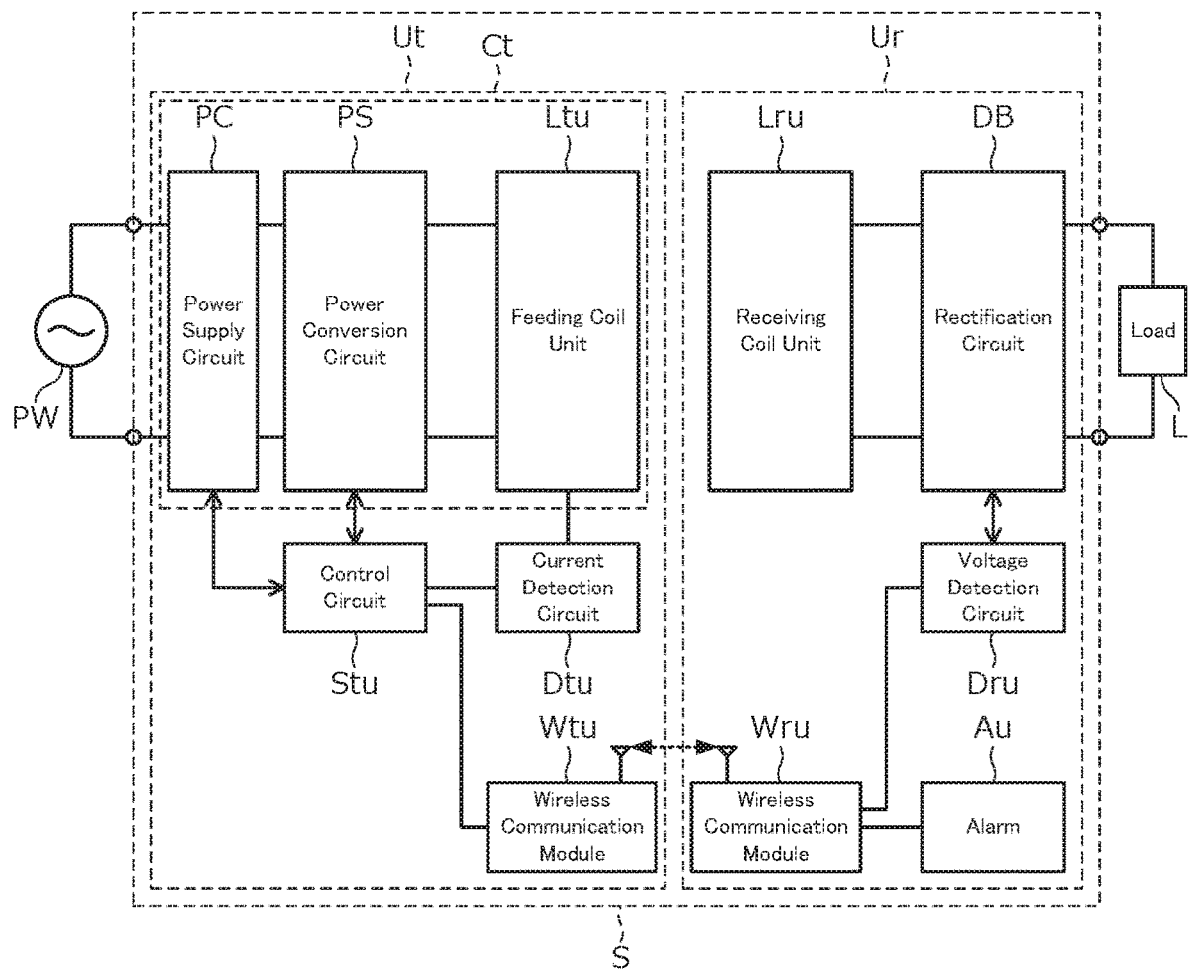
FIG. 9 is a view illustrating the configuration of the wireless power transmission system S according to a sixth embodiment of the present invention.

FIG. 9 is a view illustrating the configuration of the wireless power transmission system S according to a sixth embodiment of the present invention. The wireless power transmission system S according to the present embodiment differs from the wireless power transmission system S according to the fifth embodiment in that the alarm. Au is provided in the wireless power receiving device Ur. Hereinafter, the same reference numerals are given to the same parts as those in the fourth embodiment, and description will be made focusing the difference from the seventh embodiment.

The alarm Au is the same as that described in the fifth embodiment except that it is provided as a part of the wireless power receiving device Ur. However, the separation distance D calculated by the control circuit Stu is supplied to the alarm Au in the wireless power receiving device Ur through wireless communication executed between the wireless communication module Wtu and the wireless communication module Wru. Thus, the alarm Au according to the present embodiment can also notify the user of the separation distance D like the alarm Au according to the seventh embodiment, allowing the user to position the feeding and receiving coils while checking the separation distance D. That is, user convenience at positioning of the feeding and receiving coils is enhanced.

Figure 10:
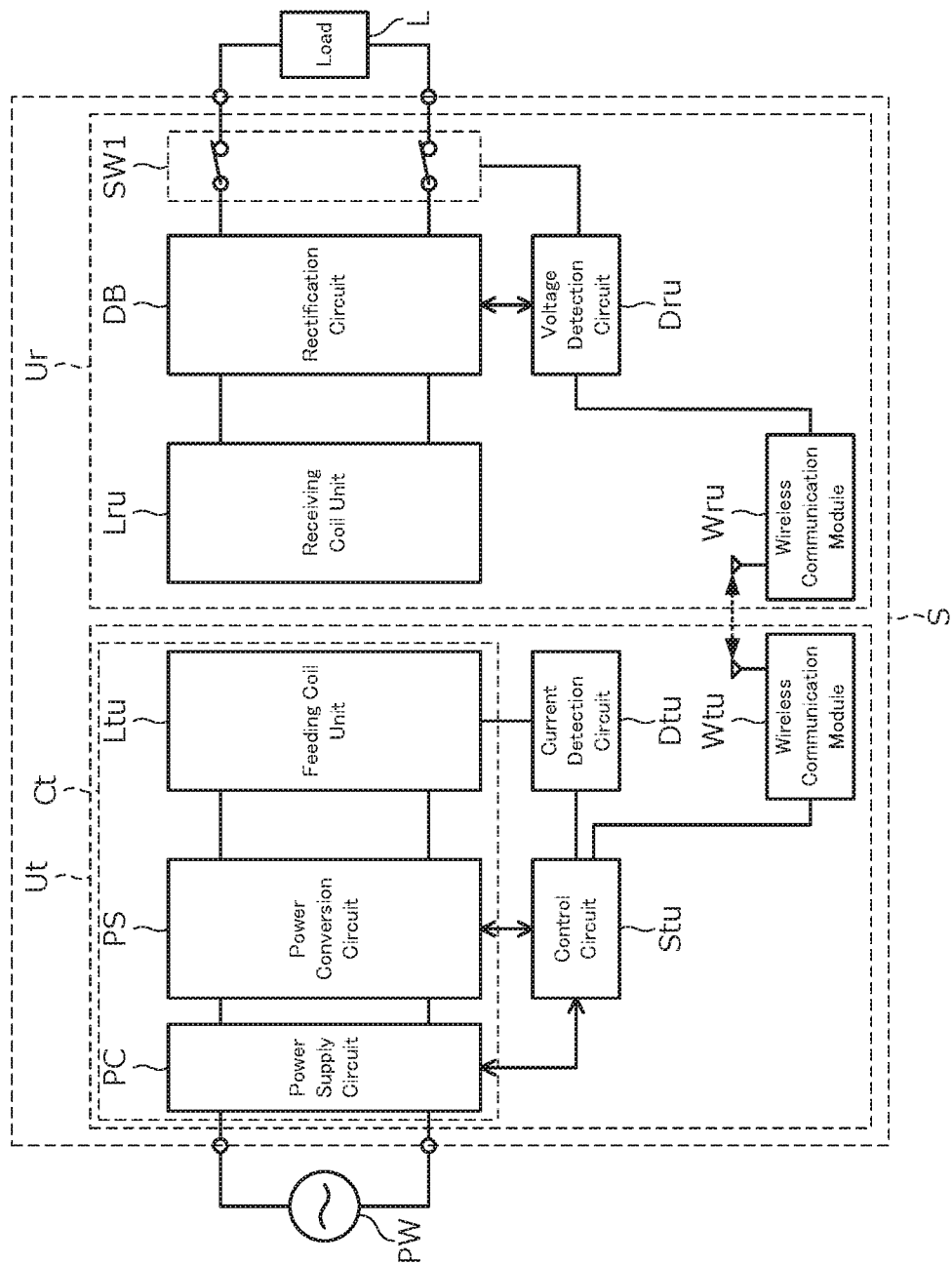
FIG. 10 is a view illustrating the configuration of the wireless power transmission system S according to a seventh embodiment of the present invention.

FIG. 10 is a view illustrating the configuration of the wireless power transmission system S according to the seventh embodiment of the present invention. The wireless power transmission system S according to the present embodiment differs from the wireless power transmission system S according to the fourth embodiment in that the wireless power receiving device Ur further has a switching circuit SW1. Hereinafter, the same reference numerals are given to the same parts as those in the fourth embodiment, and description will be made focusing the difference from the fifth embodiment.

The switching circuit SW is a circuit that switches a connection state between the output end of the rectification circuit DB and load L. Specifically, the switching circuit SW1 is configured to switch between a state where the output end of the rectification circuit DB is connected to the load L and a state where the output end of the rectification circuit DB is opened.

When the control circuit Stu according to the present embodiment calculates the coupling coefficient k between the feeding and receiving coils based on the detection result of the voltage detection circuit Dru, it controls switching circuit SW1 through wireless communication executed between the wireless communication module Wtu and wireless communication module Wru to open the output end of the rectification circuit DB. Otherwise, the control circuit Stu connects the output end of the rectification circuit DB to the load L. This allows the control circuit Stu to calculate the coupling coefficient k in a state where the rectification circuit DB is not connected to the load L. That is, it is possible to calculate the coupling coefficient k in a state where the relationship between the coupling coefficient k between the feeding and receiving coils and the output voltage of the rectification circuit DB is made independent of the load L, allowing the coupling coefficient k to be calculated with higher accuracy.

Figure 11:
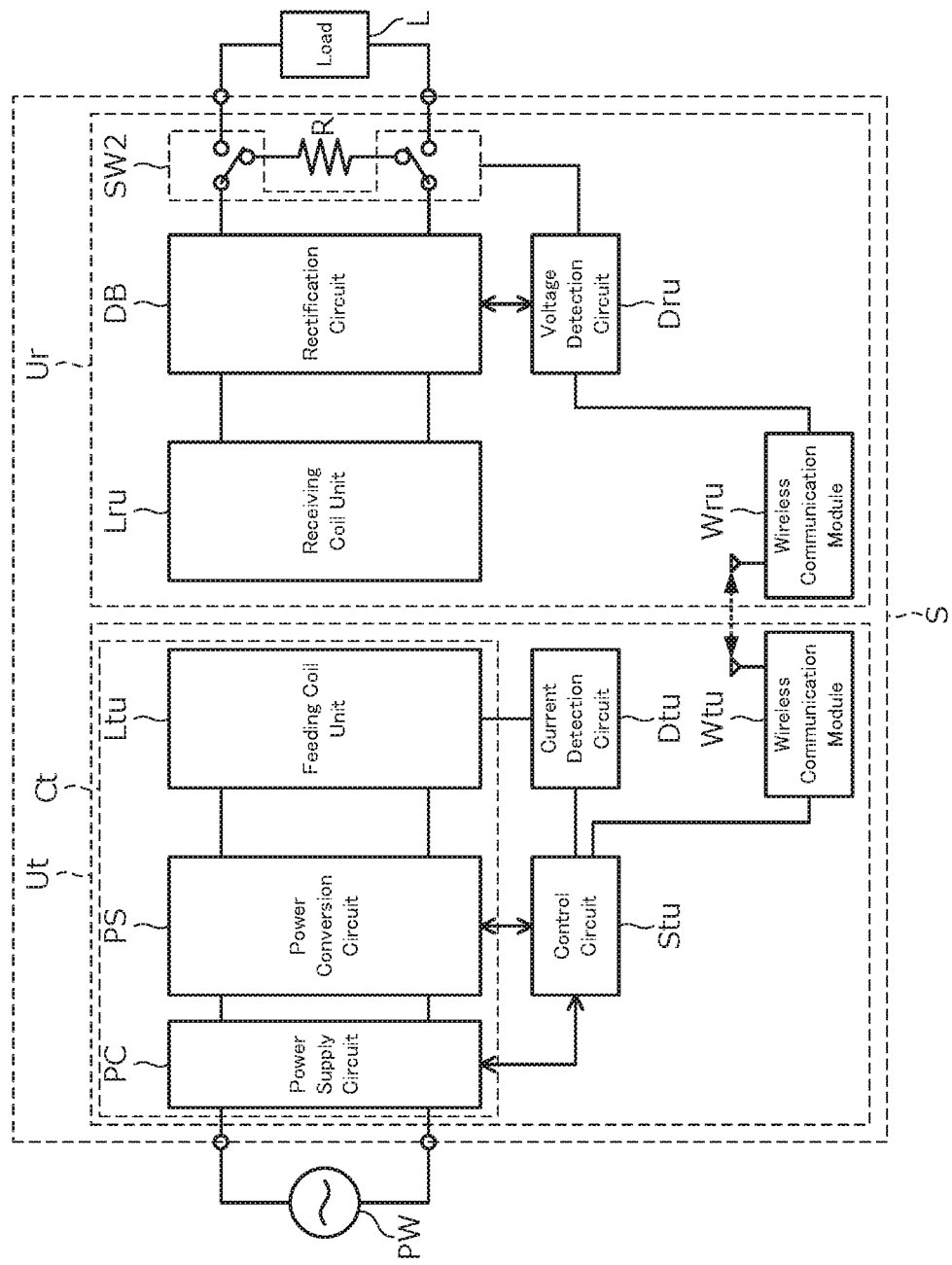
FIG. 11 is a view illustrating the configuration of the wireless power transmission system S according to an eighth embodiment of the present invention.

FIG. 11 is a view illustrating the configuration of the wireless power transmission system S according to the eighth embodiment of the present invention. The wireless power transmission system S according to the present embodiment differs from the wireless power transmission system S according to the seventh embodiment in that the wireless power receiving device Ur has a switching circuit SW2 in place of the switching circuit SW1. Hereinafter, the same reference numerals are given to the same parts as those in the seventh embodiment, and description will be made focusing the difference from the seventh embodiment.

The switching circuit SW2 is the same as the switching circuit SW1 in that it switches a connection state between the output end of the rectification circuit DB and the load L but differs therefrom in that the output end of the rectification circuit DB left unconnected with the load L is connected to a load resistance having a fixed resistance value R.

When the control circuit Stu according to the present embodiment calculates the coupling coefficient k between the feeding and receiving coils based on the detection result of the voltage detection circuit Dru, it controls switching circuit SW2 through wireless communication executed between the wireless communication module Wtu and the wireless communication module Wru to connect the output end of the rectification circuit DB to the load resistance. Otherwise, the control circuit Stu connects the output end of the rectification circuit DB to the load L. This allows the control circuit Stu to calculate the coupling coefficient k in a state where the rectification circuit DB is not connected to the load L, as in a ninth embodiment. That is, it is possible to calculate the coupling coefficient k in a state where the relationship between the coupling coefficient k between the feeding and receiving coils and the output voltage of the rectification circuit DB is made independent of the load L, allowing the coupling coefficient k to be calculated with higher accuracy.

Next, the wireless power transmission system S according to a ninth embodiment of the present invention will be described. The wireless power transmission system S according to the present embodiment is the same as the wireless power transmission system S according to the sixth embodiment illustrated in FIG. 9 on a drawing basis but differs therefrom in the content of processing that the control circuit Stu performs. That is, in the first to eighth embodiments, it is assumed that the inductance value of the feeding coil hardly changes with respect to a change in the separation distance D in the horizontal direction; however, as described later with reference to FIG. 13, a condition where the inductance value does not change is limited to a case where the separation distance in the travel direction falls within a certain range and separation distance in the vehicle width direction is maintained at a certain degree of distance. Thus, in the present embodiment, processing of the control circuit Stu when the inductance value of the feeding coil changes even with respect to a change in the separation distance D in the horizontal direction will be described focusing on the difference from the sixth embodiment.

Figure 12:
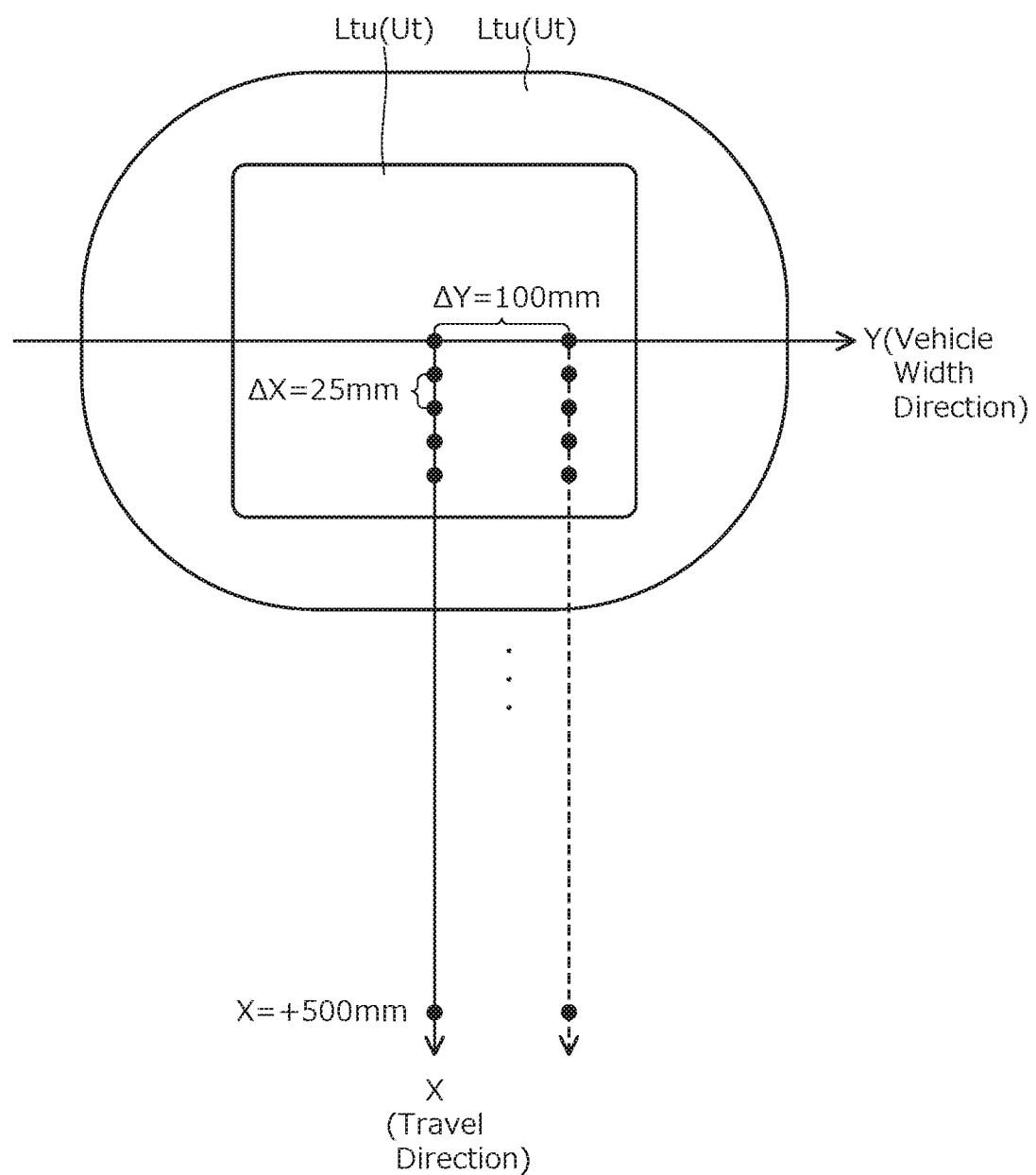
FIG. 12 is a view illustrating the feeding coil unit Ltu and receiving coil unit Lru as viewed from above.

FIG. 12 is a view illustrating the feeding coil unit Ltu and receiving coil unit Lru as viewed from above. FIG. 12 illustrates a state where the centers of the respective feeding coil unit Ltu and receiving coil unit Lru coincide with each other and, hereinafter, the center positions of the respective feeding coil unit Ltu and receiving coil unit Lru in this case are defined as a point of origin, and the travel direction and vehicle width direction of an electric car are defined as X- and Y-axes, respectively. Using a displacement $\Delta X$ from the point of origin in the travel direction and a displacement $\Delta Y$ from the point of origin in the vehicle width direction, the separation distance D between the feeding and receiving coils can be represented by $D^2=(\Delta X)^2+(\Delta Y)^2$.

Figure 13:
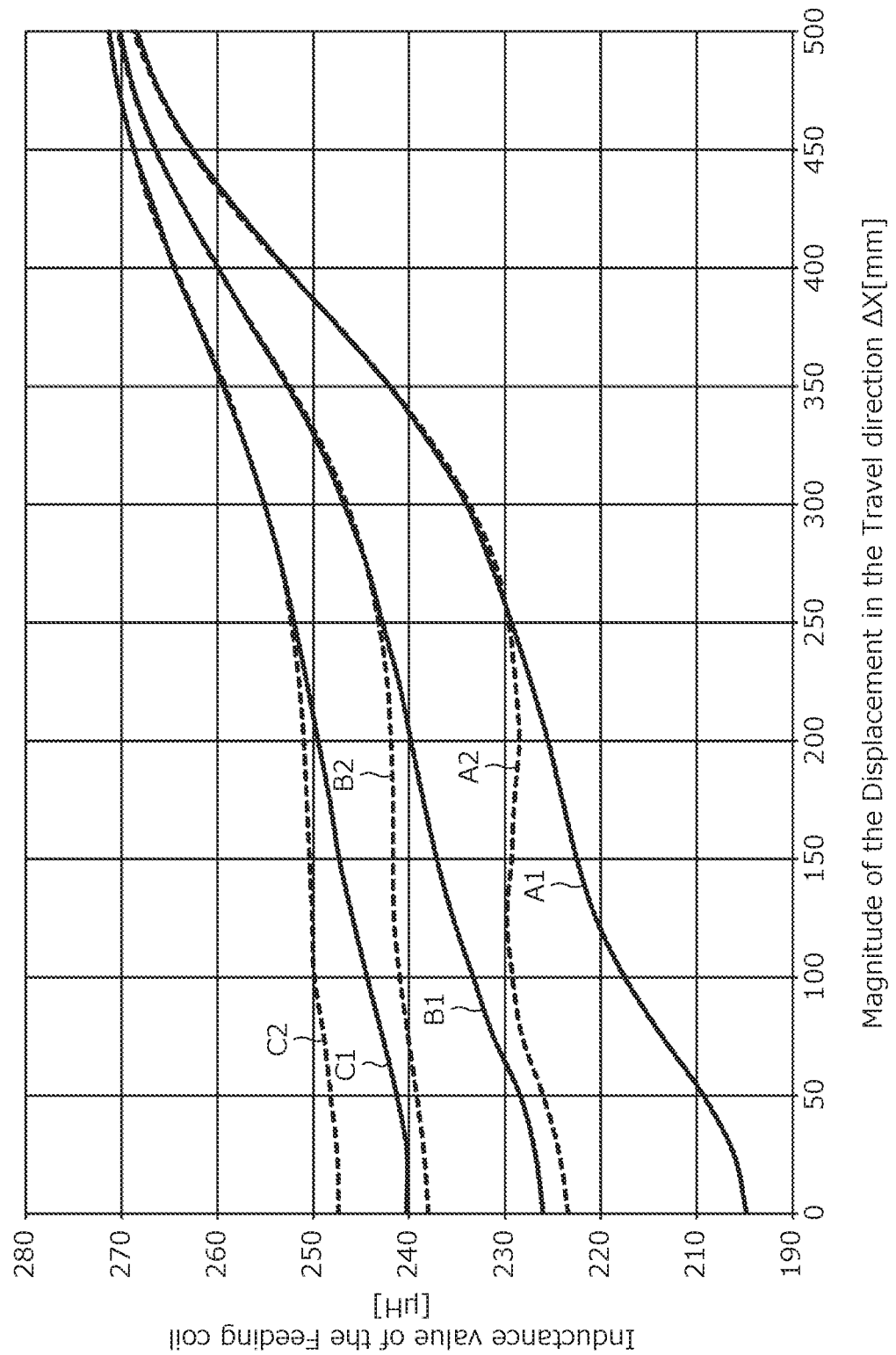
FIG. 13 is a view illustrating the relationship between the magnitude of the displacement. ΔX in the travel direction and the inductance value of the feeding coil.

FIG. 13 is a view illustrating the relationship between the magnitude of the displacement $\Delta X$ in the travel direction and the inductance value of the feeding coil. The horizontal axis indicates the displacement $\Delta X$ in the travel direction in millimeters, and the vertical axis indicates the inductance value of the feeding coil in microhenries.

Curves A1, B1, and C1 illustrated in FIG. 13 are curves obtained when the displacement $\Delta Y$ in the vehicle width direction is 0 mm, and the separation distances Z between the feeding coil unit Ltu and receiving coil unit Lru in their opposing direction are 100 mm, 125 mm, and 150 mm, respectively. Curves A2, B2, and C2 illustrated in FIG. 13 are curves obtained when the displacement $\Delta Y$ in the vehicle width direction is 100 mm, and the separation distances Z between the feeding coil unit Ltu and receiving coil unit Lru in their opposing direction are 100 mm, 125 mm, and 150 mm, respectively.

The example (example in which the inductance value of the feeding coil hardly changes with respect to a change in the separation distance D in the horizontal direction) illustrated in FIG. 2A corresponds to a case where the displacement $\Delta X$ in the travel direction is about 100 mm to about 250 mm, and the displacement $\Delta Y$ in the vehicle width direction is 100 mm. In this case, it can be understood from the curves A2, B2, and C2 of FIG. 13 that the inductance value of the feeding coil hardly changes with respect to the separation distance D. The first to eighth embodiments focus particularly on the above case; however, in the present embodiment, processing covering the curves A1, B1, C1, A2, B2, and C2 illustrated in FIG. 13 will be described.

Figure 14:
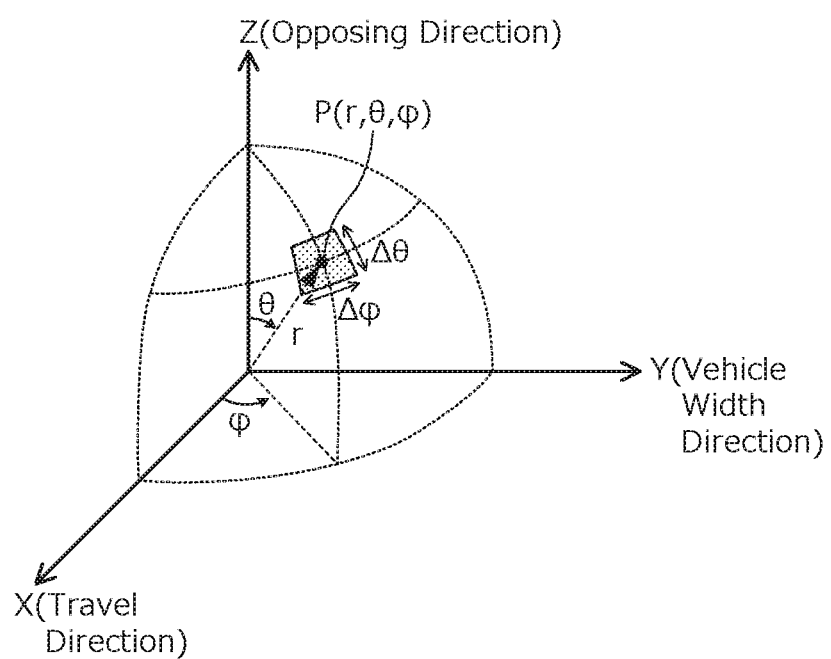
FIG. 14 is a view illustrating the calculation principle of the relative positional relationship between the feeding and receiving coils according to the present embodiment.

FIG. 14 is a view illustrating the calculation principle of the relative positional relationship between the feeding and receiving coils according to the present embodiment. When the relative positional relationship between the feeding and receiving coils is represented using three-dimensional spherical coordinates P (r, $\theta$, $\phi$) centered at the above-mentioned point of origin, r, $\theta$, and $\phi$ can be calculated from the circuit characteristic value (e.g., at least one of the output DC current of the power supply circuit PC, output DC voltage of the power supply circuit PC, DC power supplied from the power supply circuit PC to the power conversion circuit PS, the frequency of the AC power generated by the power conversion circuit PS, and the time ratio of the plurality of switching elements constituting the power conversion circuit PS, including the inductance value of the feeding coil calculated from the above values) of the wireless power transmitting device Ut, and r can be calculated from the coupling coefficient k between the feeding and receiving coils. Thus, the control circuit Stu according to the present embodiment prepares in advance a lookup table correlating the relative positional relationship between the feeding and receiving coils with a combination of the circuit characteristic value of the wireless power transmitting device Ut and the coupling coefficient k and reads the relative positional relationship corresponding to the actually acquired combination from the lookup table, thereby obtaining the relative positional relationship between the feeding and receiving coils.

Table 1 is an example of the lookup table. A part of the character string "0.6 kW/($\Delta$ra, $\Delta\theta$a, $\Delta\phi$a)", etc., written in each column of Table 1 before the slash indicates the transmittable power, and a part thereof after the slash indicates the relative positional relationship between the feeding and receiving coils. A indicates that each value is calculated as a value having a predetermined range. FIG. 14 illustrates an example of a range that each of Δθa and Δφa can assume. As can be understood from FIG. 14, according to the calculation method of the present embodiment, r, θ, and φ are each calculated as a value in a range having a certain degree of error.

TABLE 1

|  | | Circuit characteristic value of the wireless power transmitting device Ut | | |
|---|---|---|---|---|
|  | | ... 220 μH | ... | 250 μH |
| Coupling coefficient k | 0.04 | ... 0.6 kW/ (Δra, Δθa, Δφa) | ... | 0.7 kW/ (Δrb, Δθb, Δφb) |
|  | 0.06 | ... 1.2 kW/ (Δrc, Δθc, Δφc) | ... | 1.4 kW/ (Δrd, Δθd, Δφd) |
|  | ... | ... | ... | ... |
|  | 0.24 | ... 3.3 kW/ (Δre, Δθe, Δφe) | ... | 3.3 kW/ (Δrf, Δθf, Δφf) |

Figure 15:
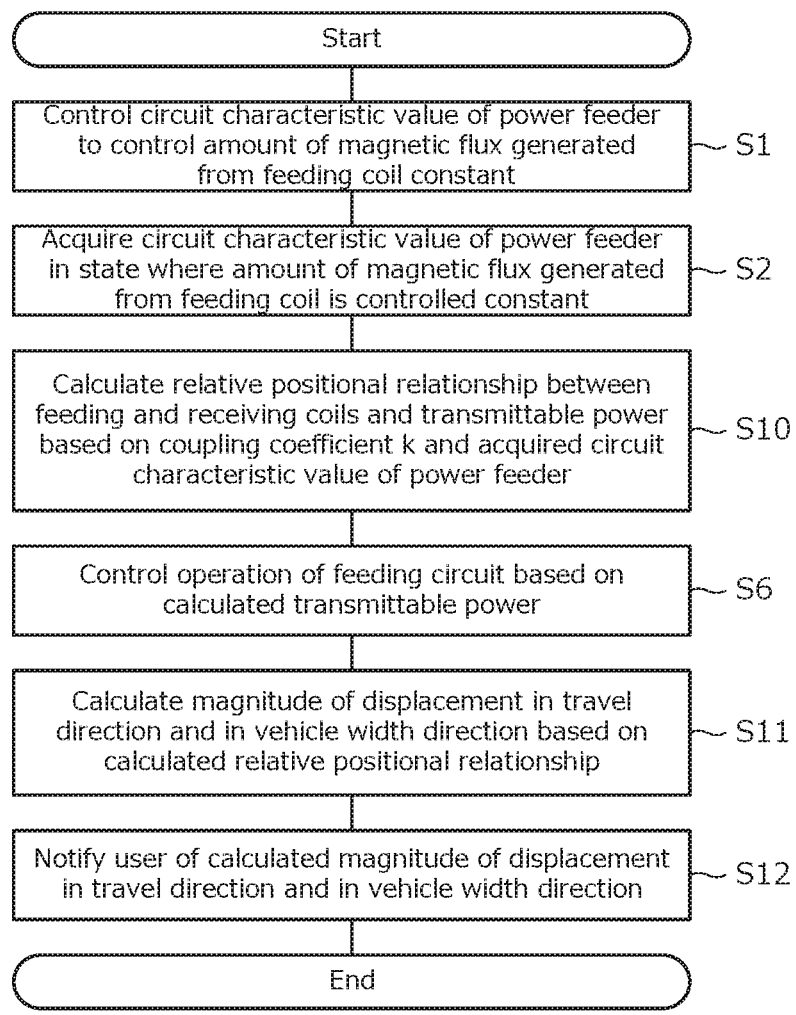
FIG. 15 is a flowchart illustrating a processing flow performed by the control circuit Stu according to a ninth embodiment of the present invention.

FIG. 15 is a flowchart illustrating a processing flow performed by the control circuit Stu according to the present embodiment. As can be understood by comparison between FIG. 15 and FIG. 4, in the processing flow of FIG. 15, steps S3 to S5 of FIG. 4 are replaced by step S10, and steps S11 and S12 are added after step S6.

After step S2, the control circuit Stu according to the present embodiment refers to the lookup table of Table 1 based on the circuit characteristic value of the wireless power transmitting device Ut acquired in step S2 and coupling coefficient k acquired as described in the fourth embodiment to calculate the relative positional relationship between the feeding and receiving coils and the transmittable power (step S10).

Subsequently, as described in the first embodiment, the control circuit Stu controls the operation of the feeding circuit Ct based on the calculated transmittable power (step S6). As a result, power transmission to the wireless power receiving device Ur is executed with power adequate for the relative positional relationship between the feeding and receiving coils.

Further, the control circuit Stu calculates the magnitude of the displacement in the travel direction and that in the vehicle width direction based on the calculated relative positional relationship (step S11). Specifically, in this processing, the three-dimensional spherical coordinates P (r, θ, φ) are converted into XYZ coordinates to calculate the displacements ΔX and ΔY in the respective travel and vehicle width directions from the above-mentioned point of origin. Thereafter, the control circuit Stu notifies a user of the calculated magnitude of the displacement in the travel direction and that in the vehicle width direction by using the alarm Au illustrated in FIG. 9 (step S12). This allows the user to position the feeding and receiving coils while checking the magnitude of the displacement in the travel direction and that in the vehicle width direction.

As described above, according to the wireless power transmission system S of the present embodiment, even when the inductance value of the feeding coil changes with respect to a change in the separation distance D in the horizontal direction, it is possible to calculate the relative positional relationship between the feeding and receiving coils from the circuit characteristic value of the wireless power transmitting device Ut in a state where the amount of magnetic flux generated from the feeding coil is controlled so as to be constant and the coupling coefficient k between the feeding and receiving coils. This allows power transmission to the wireless power receiving device Ur to be executed with power adequate for the relative positional relationship between the feeding and receiving coils without using a special sensor.

Further, with the wireless power transmission system S according to the present embodiment, it is possible to notify the user of the magnitude of the displacement in the travel direction and that in the vehicle width direction, thereby allowing the user to position the feeding and receiving coils while checking the magnitude of the displacement in the travel direction and that in the vehicle width direction. Thus, user convenience at positioning of the feeding and receiving coils is enhanced.

In the present embodiment, the direction and magnitude of the displacement is notified to the user through the alarm Au in the wireless power receiving device Ur; alternatively, the alarm Au may be provided in the wireless power transmitting device Ut as illustrated in FIG. 8, through which the direction and magnitude of the displacement may be notified to the user.

Further, the actual feeding and receiving coils are not each left-right symmetric, so that when the receiving coil is displaced with respect to the feeding coil by a certain distance in the vehicle width direction, the to-be-obtained circuit characteristic value of the wireless power transmitting device Ut and coupling coefficient k may sometimes differ between the case when the displacement occurs to the right and the case when it occurs to the left. Utilizing this, the direction of the displacement in the vehicle width direction is also acquired in step S11, and the acquired direction may be notified to the user together with the magnitude of the displacement in the travel direction and that in the vehicle width direction. This further enhances user convenience.

While the preferred embodiments of the present invention have been described, it should be understood that the present invention is not limited to the above embodiments and can be practiced in various forms without departing from the sprit and scope of the invention.

For example, a detection coil for measuring the amount of magnetic flux generated from the feeding coil in the feeding coil unit Ltu may be additionally provided, and the amount of magnetic flux detected by the detection coil may be used in place of the feeding coil current value detected by the current detection circuit Dtu. That is, the amount of magnetic flux detected by the detection coil may be used as the monitoring value for grasping whether or not the amount of magnetic flux generated from the feeding coil in the feeding coil unit Ltu is kept constant. Even with this configuration, it is possible to control the amount of magnetic flux generated from the feeding coil in the feeding coil unit Ltu so as to be constant.

Further, in the second embodiment, when the inductance value of the feeding coil included in the feeding coil unit Ltu is made variable, one or more of operation control for the power supply circuit PC, operation control for the power conversion circuit PS, reactance value control for the impedance conversion circuit Xtu, and inductance value control for the feeding coil included in the feeding coil unit Ltu may be executed as the operation control for the feeding circuit Ct in step S6.

REFERENCE SIGNS LIST

Au: Alarm
Ct: Feeding circuit

DB: Rectification circuit
Dru: Voltage detection circuit
Dtu: Current detection circuit
Lru: Receiving coil unit
Ltu: Feeding coil unit
PS: Power conversion circuit
PW: External power supply
L: Load
S: Wireless power transmission system
SW1, SW2: Switching circuit
Stu: Control circuit
Ur: Wireless power receiving device
Ut: Wireless power transmitting device
Vea, Veb: Electric car
Wru, Wtu: Wireless communication module
Xtu: Impedance conversion circuit

What is claimed is:

1. A wireless power transmitting device that transmits power by wireless to a wireless power receiving device through magnetic coupling between a feeding coil and a receiving coil, the wireless power transmitting device comprising:
    a feeding circuit including a power conversion circuit that converts DC power into AC power of a drive frequency and the feeding coil that receives the AC power supplied from the power conversion circuit to generate an AC magnetic field; and
    a control circuit that controls an amount of magnetic flux generated from the feeding coil,
    wherein the control circuit calculates a separation distance between the feeding and receiving coils in their opposing direction from a circuit characteristic value of the wireless power transmitting device in a state where the amount of magnetic flux generated from the feeding coil is controlled so as to be constant.

2. The wireless power transmitting device as claimed in claim 1,
    wherein the feeding circuit further includes a power supply circuit that converts power supplied from an external power supply into the DC power and outputs the DC power to the power conversion circuit, and
    wherein the control circuit controls the amount of magnetic flux generated from the feeding coil by changing at least one of an output DC current of the power supply circuit, an output DC voltage of the power supply circuit, and the DC power.

3. The wireless power transmitting device as claimed in claim 1,
    wherein the power conversion circuit has a plurality of switching elements, and
    wherein the control circuit controls the amount of magnetic flux generated from the feeding coil by changing the drive frequency or a time ratio of the plurality of switching elements.

4. The wireless power transmitting device as claimed in claim 1,
    wherein the feeding circuit further includes an impedance conversion circuit that has at least one of a capacitor and an inductor between the power conversion circuit and feeding coil, and
    wherein the control circuit controls the amount of magnetic flux generated from the feeding coil by changing a reactance value of the impedance conversion circuit.

5. The wireless power transmitting device as claimed in claim 1,
    wherein the inductance value of the feeding coil is variable, and
    wherein the control circuit controls the amount of magnetic flux generated from the feed coil by changing the inductance value of the feeding coil.

6. The wireless power transmitting device as claimed in claim 1, wherein the control circuit controls the amount of magnetic flux generated from the feeding coil so as to be constant by controlling a circuit characteristic value of a type same as the circuit characteristic value of the wireless power transmitting device.

7. A wireless power transmission system that transmits power from a wireless power transmitting device to a wireless power receiving device through magnetic coupling between a feeding coil and a receiving coil,
    wherein the wireless power transmitting device is the wireless power transmitting device as claimed in claim 1,
    wherein the wireless power receiving device includes:
        the receiving coil that receives power through the AC magnetic field generated by the feeding coil;
        a rectification circuit that rectifies the power received by the receiving coil; and
        a voltage detection circuit that detects an output voltage of the rectification circuit, and
    wherein the control circuit calculates a coupling coefficient between the feeding and receiving coils based on a detection result output from the voltage detection circuit and calculates a relative positional relationship between the feeding and receiving coils based on the cou coefficient and the circuit characteristic value of the wireless power transmitting device.

8. The wireless power transmission system as claimed in claim 7, wherein the control circuit calculates transmittable power from the relative positional relationship between the feeding and receiving coils and controls an operation of the feeding circuit based on a calculated transmittable power.

9. The wireless power transmission system as claimed in claim 8, further comprising a switching circuit for switching a connection state between an output end of the rectification circuit and a load,
    wherein the switching circuit opens the output end of the rectification circuit when the control circuit calculates the coupling coefficient between the feeding and receiving coils based on the detection result output from the voltage detection circuit.

10. The wireless power transmission system as claimed in claim 8, further comprising:
    a load resistance having a fixed resistance value; and
    a switching circuit for switching a connection state between an output end of the rectification circuit and a load or the load resistance,
    wherein the switching circuit connects an output end of the rectification circuit to the load resistance when the control circuit calculates the coupling coefficient between the feeding and receiving coils based on the detection result output from the voltage detection circuit.

11. The wireless power transmission system as claimed in claim 7, further comprising a switching circuit for switching a connection state between an output end of the rectification circuit and a load,
    wherein the switching circuit opens the output end of the rectification circuit when the control circuit calculates the coupling coefficient between the feeding and receiving coils based on the detection result output from the voltage detection circuit.

12. The wireless power transmission system as claimed in claim 7, further comprising:

a load resistance having a fixed resistance value; and
a switching circuit for switching a connection state between art output end of the rectification circuit and a load or the load resistance,
wherein the switching circuit connects an output end of the rectification circuit to the load resistance when the control circuit calculates the coupling coefficient between the feeding and receiving coils based on the detection result output from the voltage detection circuit.

13. The wireless power transmission system as claimed in claim 7, further comprising art alarm for notifying a user of information,
wherein the control circuit calculates a separation distance between the feeding and receiving coils in a direction perpendicular to their opposing direction based on the separation direction between the feeding and receiving coils in their opposing direction and the detection result output from the voltage detection circuit, and
wherein the alarm notifies the user of the separation distance between the feeding and receiving coils in a direction perpendicular to their opposing direction.

14. A wireless power transmitting device that transmits power by wireless to a wireless power receiving device through magnetic coupling between a feeding coil and a receiving coil, the wireless power transmitting device comprising:
a feeding circuit including a power conversion circuit that converts DC power into AC power of a drive frequency and the feeding coil that receives the AC power supplied from the power conversion circuit to generate an AC magnetic field; and
a control circuit that controls current flowing in the feeding coil,
wherein the control circuit calculates a separation distance between the feeding and receiving coils in their opposing direction from a circuit characteristic value of the wireless power transmitting device in a state where the current flowing in the feeding coil is controlled so as to be constant.

15. A wireless power transmission system that transmits power from a wireless power transmitting device to a wireless power receiving device through magnetic coupling between a feeding coil and a receiving coil,
wherein the wireless power transmitting device includes:
a feeding circuit including a power conversion circuit that converts DC power into AC power of a drive frequency and the feeding coil that receives the AC power supplied from the power conversion circuit to generate an AC magnetic field; and
a control circuit that controls an amount of magnetic flux generated from the feeding coil,
wherein the wireless power receiving device includes:
the receiving coil that receives power through the AC magnetic field generated by the feeding coil;
a rectification circuit that rectifies the power received by the receiving coil; and
a voltage detection circuit that detects the output voltage of the rectification circuit, and
wherein the control circuit acquires a circuit characteristic value of the wireless power transmitting device in a state where the amount of magnetic flux generated from the feeding coil is controlled so as to be constant, calculates a coupling coefficient between the feeding and receiving coils based on a detection result output from the voltage detection circuit and calculates the relative positional relationship between the feeding and receiving coils based on the circuit characteristic value and the coupling coefficient.

16. A wireless power transmission system that transmits power from a wireless power transmitting device to a wireless power receiving device through magnetic coupling between a feeding coil and a receiving coil,
wherein the wireless power transmitting device includes:
a feeding circuit including a power conversion circuit that converts DC power into AC power of a drive frequency and the feeding coil that receives the AC power supplied from the power conversion circuit to generate an AC magnetic field; and
a control circuit that controls current flowing in the feeding coil,
wherein the wireless power receiving device includes:
the receiving coil that receives power through the AC magnetic field generated by the feeding coil;
a rectification circuit that rectifies the power received by the receiving coil; and
a voltage detection circuit that detects the output voltage of the rectification circuit, and
wherein the control circuit acquires the circuit characteristic value of the wireless power transmitting device in a state where the amount of current flowing in the feeding coil is controlled so as to be constant, calculates a coupling coefficient between the feeding and receiving coils based on a detection result output from the voltage detection circuit and calculates the relative positional relationship between the feeding and receiving coils based on the circuit characteristic value and the coupling coefficient.

* * * * *